Jan. 15, 1963  J. M. SLATER ET AL  3,073,170
FREE ROTOR GYROSCOPE CONTROL-TORQUE APPLYING MEANS
Filed March 27, 1959  6 Sheets-Sheet 1

FIG. 1

INVENTORS
JOHN M. SLATER
ROBERT B. HORSFALL
BY
AGENT

Jan. 15, 1963     J. M. SLATER ET AL     3,073,170
FREE ROTOR GYROSCOPE CONTROL-TORQUE APPLYING MEANS
Filed March 27, 1959                     6 Sheets-Sheet 2

INVENTORS.
JOHN M. SLATER
ROBERT B. HORSFALL
BY
*Louis J. Knobble*
AGENT

FIG. 4

Jan. 15, 1963   J. M. SLATER ET AL   3,073,170
FREE ROTOR GYROSCOPE CONTROL-TORQUE APPLYING MEANS
Filed March 27, 1959                                6 Sheets-Sheet 4

INVENTORS.
JOHN M. SLATER
ROBERT B. HORSFALL
BY
*Louis J. Knobbe*
AGENT

Jan. 15, 1963 J. M. SLATER ET AL 3,073,170
FREE ROTOR GYROSCOPE CONTROL-TORQUE APPLYING MEANS
Filed March 27, 1959 6 Sheets-Sheet 5

FIG. 6

INVENTORS.
JOHN M. SLATER
ROBERT B. HORSFALL
BY
AGENT

Jan. 15, 1963   J. M. SLATER ET AL   3,073,170
FREE ROTOR GYROSCOPE CONTROL-TORQUE APPLYING MEANS
Filed March 27, 1959   6 Sheets-Sheet 6

INVENTORS
JOHN M. SLATER
ROBERT B. HORSFALL
BY
AGENT

United States Patent Office 3,073,170
Patented Jan. 15, 1963

3,073,170
FREE ROTOR GYROSCOPE CONTROL-TORQUE APPLYING MEANS
John M. Slater, Fullerton, and Robert B. Horsfall, Whittier, Calif., assignors to North American Aviation, Inc.
Filed Mar. 27, 1959, Ser. No. 802,566
7 Claims. (Cl. 74—5.4)

This invention relates to control-torque applying means for use with free rotor gyroscopes and particularly to torquer means incorporating spatially adjustable magnets of a predetermined field strength.

The free rotor gyroscope makes use of a rotor supported on a spherical bearing (usually gas-lubricated) so as to have three degrees of angular freedom relative to the gyroscope support. This kind of gyroscope has several potential advantages over conventional gimbal-mounted types. The principal one is that the gyroscopic element, which is merely the rotor, is a simple and rigid member as distinguished from the complex conventional gyroscopic element consisting of a rotor mounted on ball bearings together with a motor within a hollow floated gimbal of some sort. One difficulty that exists in attempting to make use of the free rotor type of gyro in applications such as inertial navigation is that of applying a precise control torque. In these applications, the gyro must be caused to undergo precession at some particular rate, e.g., earth rotation velocity $\Omega$, or $\Omega$ plus angular velocity of the craft about the earth's center. The applied torque must typically be made accurate and reproducible to at least one part in 1000, and in some cases to better than one part in 10,000. These stringent accuracy requirements upon the torquing means do not arise in gyros used in other applications such as gyro compasses and gyro verticals, where control torque is applied in a null-seeking system. Examples of these prior art devices are shown in Patent No. 2,339,606 of F. R. Sias, Patent No. 2,360,339 of A. Hansen, Jr., Patent No. 2,417,066 of G. R. Douglas, Patent No. 2,417,081 of L. B. Lynn and Patent No. 2,418,032 of R. G. Jewell, each of which show a pendulous permanent magnet opposed to a spinning disc associated with the gyro rotor for use as erecting devices for gyro verticals.

In conventional inertial navigator gyros, application of precision control torques is typically accomplished with the aid of direct current electromagnetic torquers operating between the gimbal member and the instrument case. This type of torquer can be very accurate, but is obviously not directly applicable to a free rotor gyro since there is no way to conduct the direct current across the spherical bearing.

In another invention upon which has been filed patent application, Serial No. 783,644, entitled "Free Rotor Gyroscope Motor and Torquer Drive," filed December 19, 1958, and now Patent No. 3,025,708, by J. M. Slater and J. C. Boltinghouse and assigned to North American Aviation, Inc. assignee of the present invention, precision torques are applied to a free rotor gyro by providing a conductive sleeve or shell on the rotor in conjunction with a fixed set of electromagnets, differentially energized by varying values of current, opposed to a closely spaced flux return member. Although this torquer satisfactorily provides precision torquing, its ultimate accuracy is limited by hysteresis of the electromagnet core. Another limitation of this torquer is that it is quadratic rather than linear in its output, i.e., doubling the applied current quadruples the net applied torque. These stated limitations of variably energized electromagnet torquers may generally be overcome, but only by the use of circuits which are not easy to provide in all inertial system applications. In addition, since the input to an electromagnetic torquer is an electrical current, some sort of digital-to-analog converter is required if the torquer is to be controlled from the output of a digital computer. The output of a digital computer is a series of discrete pulse-like events which can readily be adapted to drive a precision mechanical mechanism but not so readily adapted for precise conversion into a corresponding electrical current.

It is accordingly an object of this invention to provide an improved free rotor gyroscope.

It is also an object of this invention to provide improved torquer drives for free rotor gyroscopes.

It is another object of this invention to provide means for applying very precise control-torques to free rotor gyroscopes.

It is an additional object of this invention to provide control-torque applying means for free rotor gyroscopes which do not incorporate variably energized electromagnets.

Another object of this invention is to provide free rotor gyroscope control-torquer means which are free from hysteresis and quadratic output effects.

A further object of this invention is to provide free rotor gyro control-torquer means which do not require complex and critical electrical circuitry, or the generation of accurate control currents.

It is a further object of this invention to provide free rotor gyro control-torquer means adapted for used with a rotor operating at high speed.

It is still another object of this invention to provide free rotor gyro control-torquer means which do not require the presence of any magnetic material on the rotor.

A further object of this invention is to provide gyro control-torquer means which accommodate a limited amount of rotor tilt.

It is a further object of this invention to provide free rotor gyro control-torquer means which do not require any current conductive paths between the gyro rotor and case.

It is still another object of this invention to provide free rotor gyro control-torquer means which are readily operable from the output of a digital computer.

A further object of this invention is to provide control-torquing means providing a gyro precessional angular velocity which remains substantially constant over a considerable range of speed variation of the rotor.

Other and further objects, features and advantages of the invention will become apparent as the description proceeds.

In carrying out the present invention in accordance with a preferred embodiment thereof, we provide a control-torque applying means which makes use of permanent magnets or electromagnets or constant field strength which produce, by eddy current induction, drag forces on the rotor. The magnets are movable in a manner to apply a control-torque to the rotor which is completely variable as to magnitude and direction. Our invention is based upon the consideration that the one most accurate way to produce a variable magnetic field is to physically move a predetermined magnet rather than to try to vary the strength of a magnet. Since nothing is varied other than the spatial position or orientation of the magnets, the sources of error existing in variably energized electromagnets do not exist.

A more thorough understanding of the invention may be obtained by the study of the following detailed discussion taken in conjunction with the accompanying drawings in which.

Figure 1:
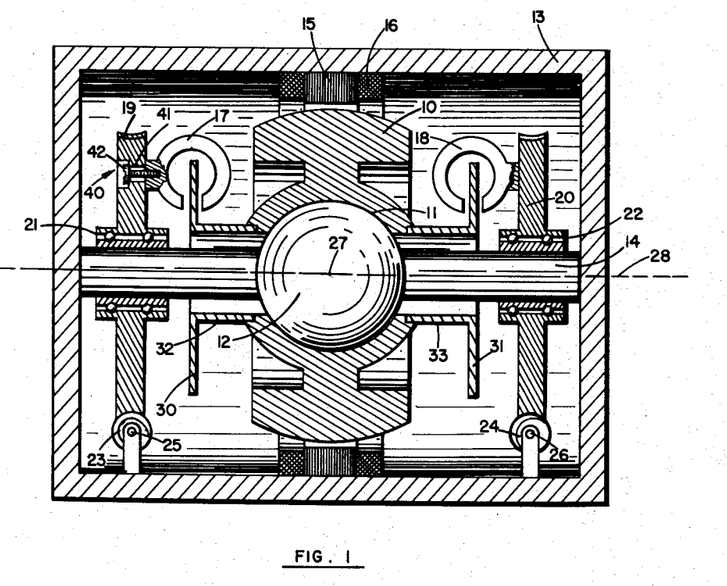
FIG. 1 shows an elevation cross section of an embodiment of the invention in which the constant magnets are mounted for angular adjustment about the gyro axis of symmetry.

Referring to FIG. 1, an embodiment of the gyroscope is shown comprising a rotor 10 supported on a self-lubricated ball type bearing at 11. This bearing is preferably constructed in accordance with the teaching of patent application, Serial No. 641,720, entitled "Free Rotor Gyroscope," filed February 21, 1957, by D. B. Duncan et al. and assigned to North American Aviation, Inc., assignee of the present invention. This type of bearing includes spherical surfaces formed on the rotor 10 thereby forming a socket which mates with a ball 12 rigidly supported to the gyro case 13 by ball support 14. This air-lubricated ball and socket bearing provides three degrees of angular freedom for the rotor 10 about the rotor center 27.

A cylindrical motor stator core 15 is rigidly mounted on the gyro case 13 so as to be closely opposed to the rotor 10. This core is preferably constructed of laminated silicon steel for reducing eddy current losses. Windings 16 are mounted in suitable slots on the periphery of the core 15. These windings are preferably encased in a suitable potting compound, thus forming smooth contoured stator surfaces. The smooth contours of the molded stator provide geometrical symmetry and thus reduce aerodynamic torque effects on the rotor. The motor stator windings 16 are commonly arranged for 3-phase power supply, with three sets of exactly similar multi-polar core groups spaced one-third of a pole pitch apart. The superposition of the three stationary but alternating fields produced by the 3-phase windings produces a sinusoidally distributed magnetic field revolving in synchronism with the power supply frequency. Motor torque, the result of eddy current induced in the conducting material forming the rotor 10, causes the rotor 10 to rotate about the gyro spin axis 28.

A two-axis pickoff system (not shown) detects angular misalignment of the case axis relative to the rotor spin axis, and adjusts the case via servo-operated gimbals in a sense to restore alinement, so that, in the operating gyro, case axis 28 can be considered as coincident with the rotor spin axis. Enough freedom is provided for the rotor (and the elements of the torquer to be described) so that transient misalinements can be accommodated without the rotor hitting stops affixed to the gyro case. For further details of the pickoff system and servos reference is made to the above described application of D. B. Duncan et al.

The control-torque applying means of the free rotor gyro of FIG. 1 includes two permanent magnets 17 and 18 each mounted for angular adjustment about the gyro spin axis 28. The apparatus which provides this angular adjustment includes gears 19 and 20 adapted for rotation about the gyro spin axis 28 by ball bearings 21 and 22 having their inner races affixed to the ball support 14 and their outer races affixed respectively to gear 19 and 20.

Mating with gear 19 is worm 23 mounted for rotation about an axis perpendicular with the gyro spin axis. Likewise worm 24 mounted for rotation about an axis perpendicular with the gyro spin axis is adapted for rotating the gear 20. Axles 25 and 26 are affixed to the respective worm 23 and 24 about their axis of rotation and are extended through the gyro case 13 to a suitable driving mechanism. If the control signals are digital in form, stepping motors conveniently drive the axles 25 and 26. By suitably rotating the axles 25 and 26, the angular position of the permament magnets 17 and 18 may be adjusted to any position about the gyro spin axis.

Conductive discs 30 and 31 are fixedly mounted on the rotor 10 so as to be in planes perpendicular to the gyro spin axis. As shown, the discs 30 and 31 include respective cylindrically shaped center portions 32 and 33 securely engaged in suitable openings on either side of the rotor 10 so as to mount the discs between the respective magnetic fields generated by the magnets 17 and 18. These discs are preferably closeley opposed to the magnets for maximum magnetic efficiency while allowing the necessary tilt freedom for the rotor. As the eddy current motor drive causes the rotor 10 to rotate at its operating angular velocity, the magnetic fields caused by the permanent magnets produce, by eddy current induction, drag forces at the positions of the respective magnets. Since similar drag torques are desired about the rotor center 27, the cylindrical members 32 and 33 have substantially identical longitudinal dimensions whereby the discs are symmetrically positioned equidistant from the rotor center 27.

Figure 2:
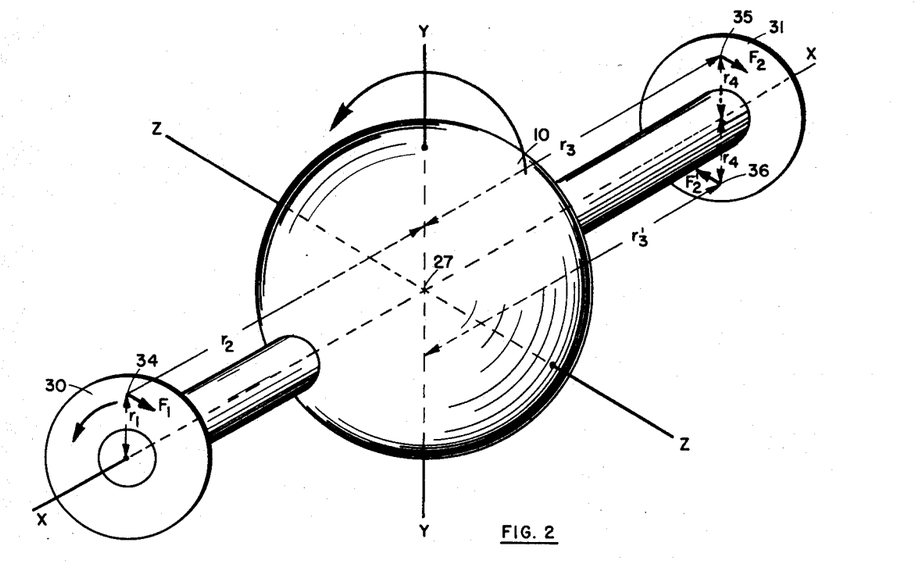
FIG. 2 illustrates the control-torques generated by the embodiment shown in FIG. 1.

The control torques developed by the gyroscopic apparatus shown in FIG. 1 are illustrated in the perspective view in FIG. 2. For convenience, the rotor 10 and discs 30 and 31 are shown in simple schematic form. Initially the magnets are assumed to be at the position shown in FIG. 1, i.e., the magnetic field is closely opposed to point 34 of disc 30 and point 35 of disc 31. For the rotor spin direction as shown, the drag forces $F_1$ and $F_2$ are developed by the magnetic field passing through the conductive discs at positions 34 and 35. The drag force $F_1$ produces one moment $M_1$ equal to the force times the moment arm $r_1$ or:

$$M_1 = F_1 r_1 \qquad (1)$$

Likewise the drag force $F_2$ produces a moment $M_2$ equal to the force times the moment arm $r_4$ or:

$$M_2 = F_2 r_4 \qquad (2)$$

The moments $M_1$ and $M_2$ simply produce a torque which opposes the rotor spin and thus call for a little extra power from the rotor drive motor. It may be noted that these moments are constant (for constant rotor velocity) regardless of the angular position of the magnets, i.e., as the points 34 and 35 are rotated about a circular path of constant $r_1$ and $r_4$, the torques still only oppose the spin of the rotor. The drag force $F_1$ also, however, produces a moment $M_3$ about an axis (Y) transverse to the gyro spin axis 28, equal to the force times the moment arm $r_2$ or:

$$M_3 = F_1 r_2 \qquad (3)$$

Similarly, the drag force $F_2$ produces a moment $M_4$ about the axis (Y) transverse to the spin axis equal to the force times the moment arm $r_3$ or:

$$M_4 = F_2 r_3 \qquad (4)$$

In the preferred construction of the gyroscope, the discs 30 and 31 are spaced equidistant from the rotor center 27, thus the moment arms $r_2$ and $r_3$ are of equal dimensions and therefore the moments $M_2$ and $M_4$ produced about the Y axis are of equal magnitude. Since the moments are of equal magnitude and of opposite sense with relation to the Y axis, the net applied torque to the rotor 10 about the Y axis is zero, i.e., there is no net torque applied which tends to rotate the rotor 10 about the Y axis.

If magnet 18 is rotated through 180 degrees angular rotation so as to apply a drag force to the conductive disc 31 at point 36 the moment generated by the force $F_2'$ is now:

$$M_4' = F_2' r_3' \quad (5)$$

This moment is of the same magnitude as before but of an opposite sense with respect to the Y axis. Thus the torques generated by the conductive discs 30 and 31 are additive and apply a maximum torque $(F_1 r_1 + F_2' r_3')$ to the gyro rotor 10 about the Y axis. Due to the gyroscopic action, the rotor 10 does not rotate about the Y axis but instead precesses at a controlled proportional rate about the Z axis. By varying the angular spatial position of the pair of magnets relative to the base, a maximum torque in any direction can be applied so as to cause precession of the gyroscope rotor about any desired axis.

Figure 3:
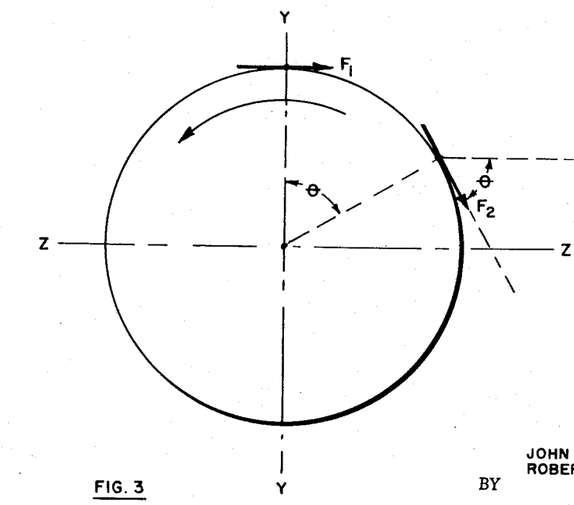
FIG. 3 illustrates the drag forces produced by the conductive discs of the embodiment shown in FIG. 1.

Not only can a control-torque be applied in any predetermined direction to the rotor 10 by the apparatus of FIG. 1, but also a torque of amplitude range from zero to maximum in either a positive or negative sense may be applied. This operation is illustrated in FIG. 3 wherein are shown the forces $F_1$ and $F_2$ generated as the angular displacement between these drag forces is varied by changing the angle $\theta$. The relationship between the moments of those forces may be shown mathematically as follows:

The entire force $F_1$ produces a moment about the Y axis or:

$$M_{y(F1)} = F_1 r_2 \quad (6)$$

while only a component of the force $F_2$ produces a moment about the Y axis or:

$$M_{y(F2)} = F_2 r_3 \cos \theta \quad (7)$$

The total moment about the Y axis is equal to the difference of the moments of Equations 6 and 7 or:

$$\Sigma M_y = F_1 r_2 - F_2 r_3 \cos \theta \quad (8)$$

The forces $F_1$ and $F_2$ are assumed to be equal in magnitude and also the moment arms $r_2$ and $r_3$ are equal, therefore Equation 8 may be rewritten as:

$$\Sigma M_y = Fr(1 - \cos \theta) \quad (9)$$

or:

$$\Sigma M_y = 2Fr \sin^2 \frac{\theta}{2} \quad (10)$$

In the device of FIG. 1, the step motors or other means connected to axles 25 and 26 are driven to maintain the desired angle between the magnets thereby setting the torque magnitude (which is, as shown in Equation 10 proportional to the square of the sine of one-half the angle between the effective axes of the magnets) and also to set the direction of the applied torque.

Although permanent magnets are illustrated in this and the other embodiments of the invention herein described, it will be appreciated by those skilled in the art that electromagnets energized from a constant current source may be substituted for the permanent magnets. By maintaining a constant current through the electromagnets, a predetermined field strength magnet is obtained and the problems associated with hysteresis are voided.

As assumed above and for highest accuracy, the drag forces produced by the two magnets 17 and 18 should be exactly equal. If they are not so, when the magnets are moved to equal and opposite angles to vary the torque magnitude, the torque direction will shift. Accordingly an adjustment is provided at 40 (FIG. 1) to allow one magnet to be shifted in or out radially. For accomplishing this, an elongated slot 41 is formed along a radius of the gear 19. The screw 42 holding the magnet 17 to the gear 19 may be loosened and the magnet moved either closer to or further away from the gyro spin axis. The magnet is thus moved to portions of the conductive disc 30 which move at greater or less tangential speed. This varies the drag force $F_1$ since the force is proportional to the eddy currents generated in the conductive disc 30, these eddy currents varying according to the linear velocity of the disc with respect to the magnet.

Figure 4:
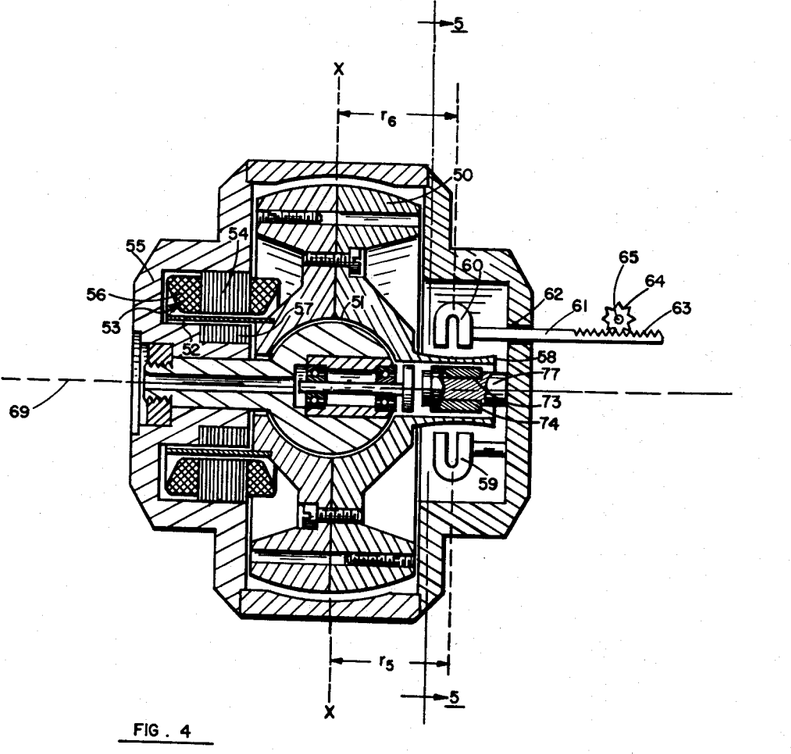
FIG. 4 shows an elevation cross section of embodiment of the invention in which the constant magnets translate along the axis of the gyroscope.
Figure 5:
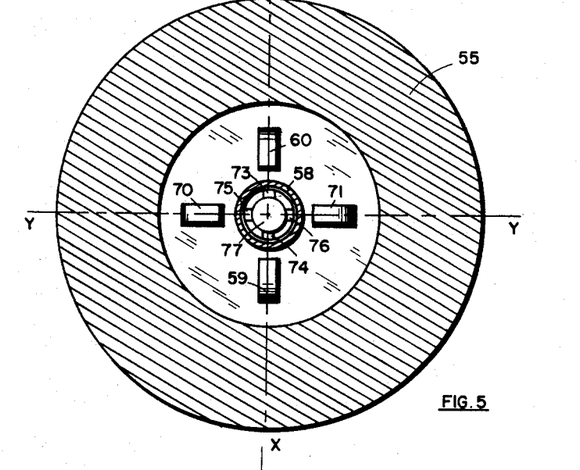
FIG. 5 shows a cross section of the embodiment of the invention shown in FIG. 4 as cut by the plane 5—5.

It will be observed that in the form of the invention shown in FIG. 1 the drag forces $F_1$ and $F_2$ and the moment arms $r_2$ and $r_3$ are both constant in magnitude, the direction of the moment vector being adjusted to vary the torque. By contrast, other embodiments of control-torquers for free rotor gyros may be constructed utilizing permanent magnets in which the drag forces and the moment arms are constant in direction, while one or the other is varied in magnitude to change the torque. Such an embodiment is shown in FIGS. 4 and 5. In this embodiment a gyroscope rotor 50 is supported by an air-lubricated ball and socket constructed in accordance with the above-described patent application, Serial No. 641,720, entitled "Free Rotor Gyroscope." The motor drive for the rotor 50 shown in FIG. 4 is identical to the motor drive taught in the above-described patent application, Serial No. 783,644, entitled "Free Rotor Gyroscope Motor and Torquer Drives." This drive includes a motor sleeve 52 closely opposed to a motor stator 53 including a cylindrical core 54 fixedly mounted on the gyro case 55 and preferably constructed of laminated silicon steel for reducing eddy current losses. Windings 56 are mounted in suitable slots on the core 54 and encased in a suitable potting compound for forming a smooth contoured stator surface. The windings 56 are commonly arranged for three-phase power supply for producing a sinusoidally distributed magnetic field revolving in synchronism with the power supply frequency. A ring 57 also preferably constructed of laminated silicon steel is fixedly mounted to the gyro case so as to lie inside the motor sleeve 52 for providing a flux path for the rotating magnetic field. The motor torque is the result of eddy currents generated in the high conductivity motor sleeve 52 attached to the rotor 50.

The free rotor gyro torquer shown in FIGS. 4 and 5 includes a conductive torquer sleeve or generally cylindrical member 58 fixedly mounted to the end of the rotor opposite that of the motor sleeve. The torquer sleeve 58 is attached to the rotor 50 by any convenient means, e.g. a shrink fit or may be integrally formed therewith as shown. A magnet 59 rigidly affixed to the case 55 is positioned so that its poles closely oppose the outer surface of the torquer sleeve 58. A similar permanent magnet 60 is located directly opposite magnet 59 in a closely opposed position to the outer surface of the torquer sleeve 58. However, magnet 60 is arranged so as to translate along the spin axis 69 of the gyro. A rod 61 affixed to the magnet passes through a suitable slide bearing 62 mounted in the gyroscope case 55. The end portion of the rod opposite that of the magnet is provided with a rack gear 63 to which is mated pinion gear 64. Magnet 60 may therefore be adjusted along the gyro spin axis by affixing a suitable drive motor or stepping motor to the shaft 65 attached to the gear pinion 64. In the cross section view of FIG. 5 are shown an additional pair of magnets 70 and 71 angularly displaced from the magnets 59 and 60 so as to lie along an axis transverse thereto. The magnets 70 and 71 are in a similar closely opposed position with respect to the torquer sleeve 58 as the magnets 59 and 60. The operation of the magnets 70 and 71 is identical to that of the magnets 59 and 60. Thus, magnet 70 is affixed to the gyro case 55 while magnet 71 may be translated along the spin axis of the gyro. Soft iron bars 73, 74, 75 and 76 are affixed to support 77 abutting from the case 55. The bars are located in the member 77 so that their longitudinal axis is parallel to the gyro spin axis and symmetrical positioned so as to be opposite the poles of magnets 59, 60, 70 and 71. These soft iron bars function as flux return members for the magnetic flux generated by the respective magnets lying in juxtaposed positions, e.g., the flux from the north pole of magnet 59 is returned to the south pole thereof by juxtaposed flux return bar 74.

The operation of the gyroscopic control-torquer shown in FIGS. 4 and 5 is as follows: each of the permanent magnets 59, 60, 70 and 71 cause drag forces to be generated along axes perpendicular to the gyro spin axis. The drag force produced by magnet 59 causes moments about an X axis transverse to the spin axis, equal to the force times the moment arm $r_5$. Similarly the drag force produced by magnet 60 causes moments about the X axis equal to the force times the moment arm $r_6$. In the magnet orientation shown, wherein the moment arm $r_5$ has the same dimension as the moment arm $r_6$, these moments are equal and opposite so that the net applied precession torque is zero. As magnet 60 translates along the gyro spin axis by rotation of shaft 65, the moment arm $r_6$ becomes either greater or less than the moment arm $r_5$. Since the moments generated by the drag forces are no longer equal in magnitude, a net torque results. The sense of this net torque is changed whenever the moment arm $r_6$ becomes greater or less than the moment arm $r_5$. Likewise the magnets 70 and 71 shown in FIG. 5 comprise a torquer for torquing the gyro about the Y axis. As the magnet 71 translates along the gyro spin axis, the moment arm associated therewith becomes either greater than, equal to or less than the moment arm of fixedly mounted magnet 70. Variable magnitude torques of opposite sense may therefore be generated about the Y axis also. The combination of the torquing magnets 59, 60, 70 and 71 provides the application of a torque of amplitude range from zero to maximum in a positive or negative sense and in any direction to the gyro rotor 50.

The torque output of the torquer apparatus shown in FIG. 4 is not strictly linear if a simple cylindrical sleeve is used. When the movable magnet is at its center or mid-point location, a greater effective volume of the conductor sleeve 58 exists for generation of eddy currents than when the magnet is near an end of the conductor sleeve. A preferred construction of the torquer sleeve 58 therefore comprises varying the thickness of the conductive sleeve as illustrated in FIG. 4 so as to provide less thickness at the middle thereof. The middle part is then less effective for drag force generation than the ends of the conductor sleeve.

Figure 6:
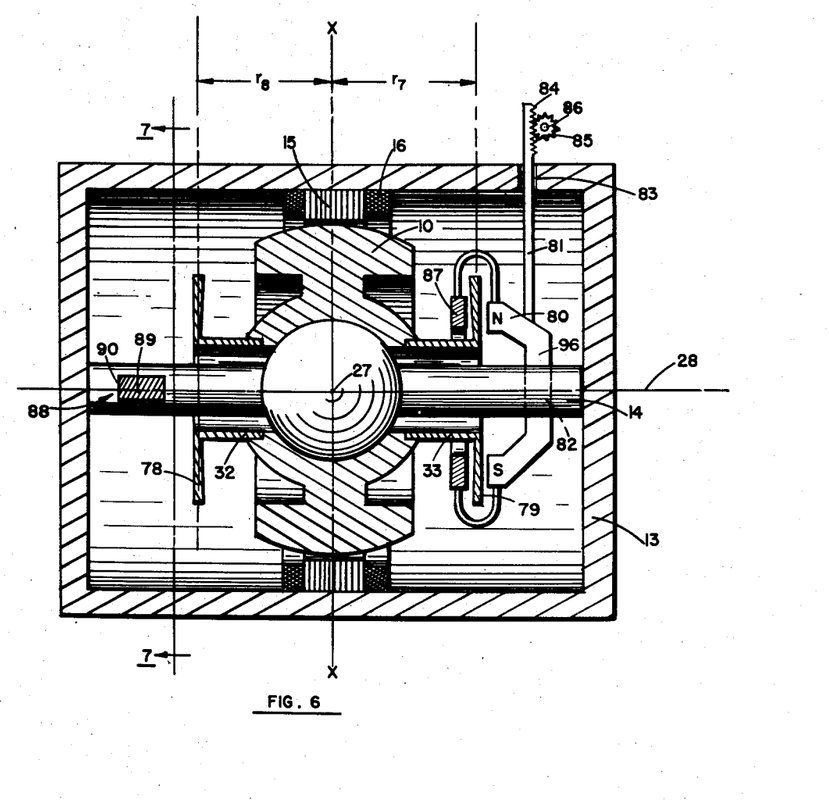
FIG. 6 shows an elevation cross section of an embodiment of the invention in which a pair of constant magnets are adjustable in translation across the diameter of the conductive disc attached to the gyro rotor.
Figure 7:
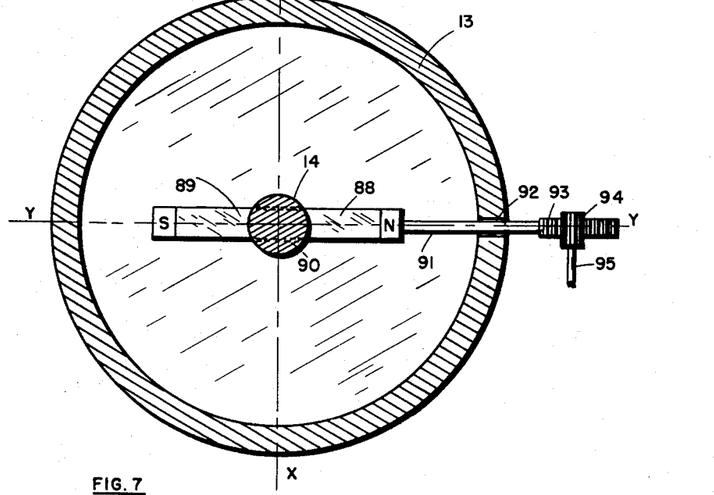
FIG. 7 shows a cross section of the embodiment of the invention shown in FIG. 6 as cut by the plane 7—7.

Another embodiment of this invention is shown in FIGS. 6 and 7. The free rotor gyroscope shown may be identical in construction to the gyroscope of FIG. 1 with the exception of a portion of the torquing mechanism. For convenience, those elements in FIGS. 1 and 6 which may be identical bear the same identification numerals. Conductive discs 78 and 79, analogous to discs 30 and 31 of the prior embodiment of FIG. 1, include respective cylindrically shaped center portions 32 and 33 fixedly engaged in suitable openings on either side of the rotor 10 so as to mount the discs in planes perpendicular to the gyro spin axis 28. A permanent magnet 80 is mounted to the gyro case 13 for motion transverse to the gyro spin axis 28 and in a position closely opposed to one surface of the disc 79. Although alternative arrangements will be apparent to those skilled in the art, one mode of arranging the magnet 80 for the desired movement is to provide the midportion of the magnet 80 with a square shank 96 which rides in a mated square hole 82 (shown by dotted lines) in the ball support 14. Attached to the magnet 80 is a rod 81 slidably supported in a suitable bearing 83 mounted in the gyro case 13. A rack gear 84 is formed on the end of the rod 81 for mating with pinion gear 85. By rotating shaft 86 affixed to pinion gear 85, the magnet 80 may be moved in translation across the diameter of the conductive disc 79. Attached to the magnet 80 and carried thereby is a soft iron ring 87 having dimensions similar to that of the magnet 80. Ring 87 serves as a flux return member for the magnetic flux generated by magnet 80 and so is mounted closely opposed to the opposite side of the conductive disc 79 opposite that of the magnet 80. A sufficient gap is left however to allow the necessary tilt freedom for the rotor.

Another magnetic assembly located at right angles (as viewed along spin axis 28) to magent 80 is associated with conductive disc 78. As shown in the cross sectional view of FIG. 7, this assembly includes a magnet 88 and a soft iron flux ring (not shown) closely opposed to the conductive disc 78 while allowing the necessary tilt freedom for the rotor 10. Magnet 88 includes a midportion in the form of a square shank 89 adapted to mate with a square hole 90 in the ball support 14. Attached to the magnet 88 is a rod 91 slidably supported in a suitable bearing 92 mounted in the gyro case 13. A rack gear 93 is formed on the end of the rod 91 for mating with pinion gear 94. By rotating shaft 95 affixed to pinion gear 94, the magnet 88 may be moved in translation across the diameter of the conductive disc 78.

The operation of the gyroscopic torquer shown in FIGS. 6 and 7 is as follows: the magnetic flux from the north pole of magnet 80 returns to the south pole of magnet 80 through the flux return ring 87. Located between the magnet and flux return ring is conductive disc 79. The passage of magnetic flux through this disc generates eddy currents when the gyroscopic rotor 10 is caused to rotate. These eddy currents generate drag forces, the magnitudes of which are determined by the relative tangential speed of the conductive disc with respect to the magnetic poles. The drag force produced by the north pole of magnet 80 causes moments about the X axis transverse to the spin axis, equal to the force times the moment arm $r_7$. Similarly the drag force produced by the south pole of magnet 80 causes moments about the X axis equal to the force times the moment arm $r_7$. The operation of the embodiment shown in FIG. 6 is thus distinguished from the operation of the embodiment shown in FIG. 4 in that the moment arms of the drag forces are of constant and equal magnitude. However, as the shaft 86 is rotated so as to translate the magnet 80 across the diameter of the conductive disc 79, the drag forces generated at the respective north and south poles of the magnet are varied since the magnet is brought to portions of the disc having different translational speeds. Thus a net torque may be produced about the X axis having a variable magnitude and either a positive or negative sense.

Similarly, the drag forces produced by the poles of magnet 88 cause moments about the Y axis equal to the force times the moment arm $r_8$. Since similar drag torques are desired about the rotor center 27, the cylindrical members 32 and 33 have substantially identical longitudinal dimensions so as to make the moment arms $r_7$ and $r_8$ equal. A net torque may be produced about the Y axis by rotating the shaft 95 so as to translate the magnet 88 across the diameter of the conductive disc 78. The drag forces generated at the respective north and south poles of this magnet are thus varied. Therefore, by rotating shafts 86 and 95 so as to translate the magnets 80 and 88 across the diameter of respective conductive discs 78 and 79, a torque of variable magnitude range in both positive and negative sense and in any direction can be applied to the gyroscope rotor 10.

In a manner similar to that used for the embodiment shown in FIG. 4, the device shown in FIG. 6 may be made precisely linear by suitably varying the thickness of the discs 78 and 79 as a function of the radius so as to provide less thickness at the middle thereof. The middle part is then less effective than the ends for drag force generation.

In the gyroscopic embodiments shown in FIGS. 4, 5, 6 and 7, individual magnets oriented along the X and Y axes are used to provide torques of variable magnitude and in any direction to the gyroscope rotor. Either of these embodiments may, however, be modified so that only a single magnet torquer device is required to produce the variable direction control-torques. Thus in the embodiment shown in the FIGS. 4 and 5, magnets 59 and 60 could be mounted upon a rotatable gear such as gear 20 of FIG. 1. The apparatus for producing the translational motion of magnet 60 along the spin axis of the gyro would be conveniently mounted upon the rotatable gear member or connected externally thereto by differential gearing. The rotatable gear member would then be rotated to provide the variable direction control-torque while the translation apparatus would effect a magnitude variation of the control torque.

In like manner, the gyroscope apparatus shown in FIGS. 6 and 7 may be modified so as to require only a single magnetic torquing device. One form of this device so modified is illustrated in the cross sectional views of FIGS. 8 and 9.

Figure 8:
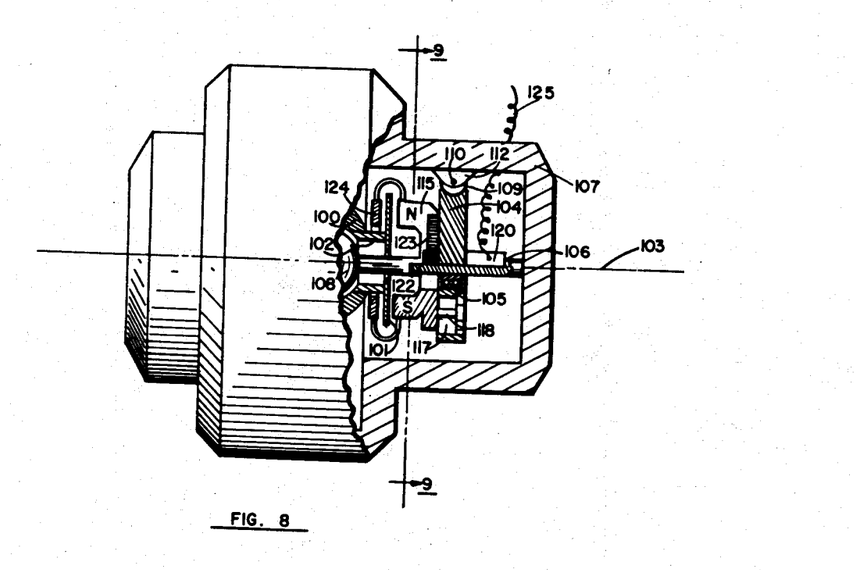
FIG. 8 shows a partial elevation cross section of an embodiment of the invention in which a single magnet is adjustable in angular displacement about the gyro spin axis and in translation across the diameter of the conductive disc attached to the gyro rotor.

Referring now to FIG. 8, the free rotor gyroscope shown may include a rotor member, self-lubricated bearing, and motor drive shown in the gyroscopic embodiment of FIG. 4. Attached to the gyroscopic rotor 100 is a conductive disc 101 including a cylindrically shaped center portion 102 fixed in a suitable opening on the side of the rotor 100 opposite that of the motor drive. The disc is so mounted that it lies in a plane perpendicular to the gyro spin axis 103. A gear 104 is adapted for rotation about the gyro spin axis 103 by ball bearing 105 having its inner race affixed to a ball support member 106 and its outer race affixed to gear 104. A portion of FIG. 8 is shown in cutaway view to show this bearing and other apparatus described below. Ball support member 106 is affixed to the gyroscope case 107 and the ball 108 forming a part of the autolubricated bearing. Mating with gear 104 is worm 109 mounted for rotation on axle 110 about an axis perpendicular to the gyro spin axis. Axle 110 is affixed to the worm 109 about its axis of rotation and extends through the gyro case 107 to a suitable driving mechanism such as a control motor or a stepping mechanism 111 (shown in FIG. 9). Axle 110 is supported by suitable bearings formed in a support member 112 and the gyroscope case 107. Thus by suitably rotating axle 110 the angular position of gear 104 may be adjusted to any position about the gyro spin axis.

Figure 9:
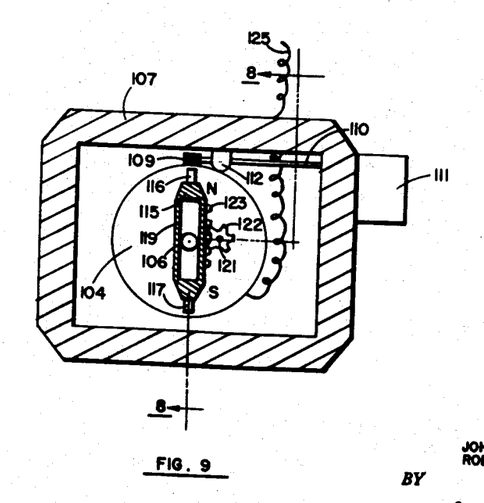
FIG. 9 shows a cross section of the embodiment of the invention shown in FIG. 8 as cut by the plane 9—9.

Referring to both FIGS. 8 and 9, a permanent magnet 115 is mounted on gear 104 for radial movement across a diameter of gear 104. Accordingly, a pair of radial slots 116 and 117 are formed in gear 104. Member 118 fixedly attached to magnet 115 is adapted for sliding movement through slot 117. A similar member (not shown) is attached to magnet 115 and adapted for sliding movement through slot 116. Member 118 is enlarged at its end opposite that of the magnet 115 so as to retain magnet 115 to the gear 104. The member adapted for sliding motion through slot 116 is likewise enlarged at its end. A suitable slot 119 is formed in the magnet 115 so as to permit the ball support 106 to pass through the magnet and permit the radial translation of the magnet on the gear 104. A suitable driving means such as a control motor or stepping mechanism 120 is mounted on the gear 104. An axle 121 from this driving means passes through the gear 104 and is affixed to a pinion gear 122. This pinion gear is adapted for mating with a rack gear 123 formed on the appropriate side of the magnet 115. Thus, as current is applied to leads 125 attached to the driving mechanism 120, the magnet 115 is caused to translate across the diameter of the gear 104. In so doing moreover the magnet 115 translates across a diameter of the conductive disc 101. As in the embodiment shown in FIGS. 6 and 7 a soft iron ring 124 having dimensions similar to that of the magnet 115 is attached to the magnet 115 and carried thereby. The ring 124 is mounted so as to be closely opposed to the side of the conductive disc 101 opposite that of a magnet 115 and function as a flux return member. The leads 125 are shown as flexible leads thereby allowing the driving mechanism 120 to be rotated about the gyro spin axis through a limited angular displacement of 360°. In this torquer embodiment a displacement of one complete revolution will permit torques of variable magnitude and opposite sense, and variable direction to be applied to the gyro rotor. This limitation on rotation of the gear 104 requires that the driving mechanism 111 be provided with reversing mechanism for changing the direction of movement of axle 110 after the gear 104 has traveled through one rotation. It will be apparent to those skilled in the art that slip rings may be substituted for the flexible leads thereby allowing the gear 104 to be driven about the spin axis 103 without any limitation on its angular displacement.

The operation of the gyroscopic control-torquer shown in FIGS. 8 and 9 is quite similar to that in the torquer shown in FIGS. 6 and 7, i.e., the magnetic flux from the north pole of magnet 115 returns to the south pole of magnet 115 through the flux return ring 124. Located between the magnet and flux return ring is conductive disc 101. The passage of magnetic flux through this disc generates eddy currents when the gyroscopic rotor 100 is caused to rotate. These eddy currents generate drag forces, the magnitudes of which are determined by the relative tangential speed of the conductive disc with respect to the magnetic poles. In the present embodiment of the invention the angular position of magnet 115 may be varied so as to cause moments about any axis transverse to the spin axis. The operation of this embodiment is thus distinguished from the operation of the embodiment shown in FIGS. 6 and 7 wherein the magnets were fixed in position so as to cause moments either about an X or a Y axis. As control currents are applied to lead 125, shaft 121 is rotated so as to translate the magnet 115 across the diameter of the conductive disc 101. Accordingly, the drag forces generated at the respective north and south poles of the magnet are varied since the magnet is brought to portions of the disc having different translational speeds. Thus a net torque may be reproduced about any predetermined axis of variable magnitude and either a positive or negative sense.

All of the torquer embodiments shown may have a temperature coefficient. The flux of permanent magnet materials typically falls off about two parts in ten thousand per degree centigrade temperature increase, so that the torque produced by interaction of the magnetic field with the induced eddy currents falls off at about twice this rate or four parts in ten thousand per degrees centigrade. This temperature effect can be avoided by use of the magnetic material Alnico 6, provided the effective length-to-diameter ratio of the magnet is made 2:1 or less (such magnet has zero temperature coefficient). Alternatively, if a more conventional magnetic material such as Alnico 5 is used, the temperature effect can be obviated by use of temperature-sensitive magnetic shunts in ways well-known in the art.

The conductive discs and sleeves also are subject to a decrease in conductivity of about three parts in one thousand per degree centigrade temperature increase for materials such as aluminum and copper. This source of torque variation with temperature can be obviated by the use of Manganin or Constantan, alloys having a substantially zero temperature resistivity coefficient at operating temperatures.

In all of the forms of the invention we have described, it is seen that to vary the torque on the gyro all that is done is to physically move a magnet. The torquer accuracy is limited only by the constancy of the magnet field and the conductivity of the conductor as a function of temperature and time. Thus our torquer is completely independent of values of any circuit elements, voltage standards, etc. Our torquer also retains the advantage of the variable electromagnet type, of having the gyro precession angular velocity ω, for a given movement of the magnet, remain substantially constant over a considerable range of speed variation of the rotor. This is because the drag force exerted by the magnet is a substantially linear function of gyro rotor speed, as is also the angular momentum, so that increase or decrease of the rotor speed proportionally increases or decreases the torque. Thus there is no necessity for precision speed control for the rotor—a considerable practical advantage.

All the torquers described are readily adaptable for operation from the output of a digital computer. The computer output can drive a stepping motor, for example, which turns the shaft or shafts which vary the spatial position of the magnet. No special conversion digital to analog equipment is thus required.

Although the invention has been described and illustrated in detail, it is to be clearly understood that the same is by way of illustration and example only and is not to be taken by way of limitation, the spirit and scope of this invention being limited only by the terms of the appended claims.

We claim:
1. In a free-rotor gyro having a rotor supported for three degrees of angular freedom relative to the gyro case; means for causing said rotor to rotate about the gyro spin axis; and precision control-torque applying means comprising a conductive shell fixedly related to said rotor and being a figure of revolution about said spin axis; first, second, third and fourth magnets each having a substantially constant field strength; means for mounting said first magnet in fixed relation with said gyro case so that the poles of said first magnet closely oppose said conductive shell; means for mounting said second magnet to said gyro case for translational adjustment along said spin axis while maintaining the poles of said second magnet closely opposed said conductive shell in a position opposite that of said first magnet; means for mounting said third magnet in fixed relation with said gyro case so that the poles of said third magnet closely oppose said conductive shell in a position from said first magnet which is displaced 90° along the circumferential path defined by said conductive shell; and means for mounting said fourth magnet to said gyro case for translational adjustment along said spin axis while maintaining the poles of said second magnet closely opposed said conductive shell in a position opposite that of said third magnet.

2. The free-rotor gyro of claim 1 wherein first, second, third and fourth flux return members are affixed to said gyro case so as to closely oppose the surface of said conductive shell opposite the surface closely opposed to said magnets, said flux return members being symmetrically located so as to be juxtaposed respectively to said first, second, third and fourth magnets.

3. In a free-rotor gyro having a rotor supported for three degrees of angular freedom relative to the gyro case, means for causing said rotor to rotate about the gyro spin axis, precision control-torque applying means comprising a conductive means fixedly related to said rotor and spinning with the rotor, a first and second magnet means of substantially constant field intensity mounted on the gyro case and having closely spaced poles adjacent said conductive means, said magnet means being positioned to produce a force F at a predetermined point on said conductive means so as to impose on said rotor a moment M in accordance with the product of an eddy current drag force F and the moment arm $r$ measured by the distance from the point on said conductive means of generation of said eddy current drag force F to the plane passing through the center of said rotor and normal to the rotor spin axis, each of said magnet means comprising a magnet closely opposed to said conductive means, at least one of said magnets being adjustable in a direction parallel to said rotor spin axis to vary the effective magnitude of said moment M by causing the magnitude of the moment arm $r$ to vary, and means mechanically connected to said one of said magnets for adjusting the spatial orientation of said one of said magnets relative to said conductive means in a manner to vary said movement M whereby the control torque on said rotor is varied.

4. The free-rotor gyro of claim 3 wherein said means for adjusting the spatial orientation of said magnet means relative to said conductive means includes means responsive to electrical control signals.

5. In a free-rotor gyro having a rotor supported for three degrees of angular freedom relative to the gyro case, means for causing said rotor to rotate about the gyro spin axis, precision control-torque applying means comprising a conductive means fixedly related to said rotor and spinning with the rotor, said conductive means comprising a conductive sleeve coaxial with said gyro spin axis, a first and second magnet means of substantially constant field intensity mounted on the gyro case and having closely spaced poles adjacent said conductive means, said magnet means being positioned to produce a force F at a predetermined point on said conductive means so as to impose on said rotor a moment M in accordance with the product of an eddy current drag force F and the moment arm $r$ measured by the distance from the point on said conductive means of the generation of force F to the plane passing through the center of said rotor and normal to said gyro spin axis, each of said magnet means comprising a magnet closely opposed to said sleeve, one of said magnets being adjustable in a direction parallel to said gyro spin axis to vary the effective magnitude of said moment M by causing the magnitude of the moment arm $r$ to vary, and means mechanically connected to said one of said magnets for adjusting the spatial orientation of said one of said magnet means relative to said conductive means in a manner to vary said moment M whereby the control torque on said rotor is varied.

6. The free-rotor gyro of claim 5 wherein said conductive sleeve is of variable thickness along its longitudinal axis so as to provide a substantially constant eddy current drag force regardless of the position of said magnet.

7. The free-rotor gyro of claim 6 wherein the thickness of said conductive sleeve is less at the middle thereof than at the ends.

References Cited in the file of this patent
UNITED STATES PATENTS

| | | |
|---|---|---|
| 2,417,689 | Johnson | Mar. 18, 1947 |
| 2,486,897 | Wendt | Nov. 1, 1949 |
| 2,519,459 | Hanna et al. | Aug. 22, 1950 |
| 2,527,245 | Cunningham et al. | Oct. 24, 1950 |
| 2,832,932 | Baermann | Apr. 29, 1958 |
| 2,874,578 | Sedgfield et al. | Feb. 24, 1959 |

UNITED STATES PATENT OFFICE
CERTIFICATE OF CORRECTION

Patent No. 3,073,170                          January 15, 1963

John M. Slater et al.

It is hereby certified that error appears in the above numbered patent requiring correction and that the said Letters Patent should read as corrected below.

Column 2, line 52, for "or", second occurrence, read -- of --; column 4, line 55, after "constant" insert -- radius --; line 70, for "$M_2$" read -- $M_3$ --; column 8, line 5, for "magent" read -- magnet --; column 12, line 14, for "movement" read -- moment --.

Signed and sealed this 31st day of March 1964.

(SEAL)
Attest:
ERNEST W. SWIDER

Attesting Officer

EDWARD J. BRENNER

Commissioner of Patents